United States Patent
Gharpure (10) Patent No.: US 8,594,845 B1
(45) Date of Patent: Nov. 26, 2013

(54) METHODS AND SYSTEMS FOR ROBOTIC PROACTIVE INFORMATIONAL RETRIEVAL FROM AMBIENT CONTEXT

(75) Inventor: Chaitanya Gharpure, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/466,089

(22) Filed: May 7, 2012

Related U.S. Application Data (60) Provisional application No. 61/483,295, filed on May 6, 2011, provisional application No. 61/593,095, filed on Jan. 31, 2012.

(51) Int. Cl.
*G06F 17/00* (2006.01)
*G10L 15/08* (2006.01)

(52) U.S. Cl.
USPC ................................ 700/253; 700/257; 901/1

(58) Field of Classification Search
USPC ................. 700/246, 250, 253, 257, 258, 259; 901/1, 46, 47
See application file for complete search history.

(56) References Cited

U.S. PATENT DOCUMENTS

| | | | |
|---|---|---|---|
| 7,305,381 B1 | 12/2007 | Poppink et al. | |
| 7,702,718 B2 | 4/2010 | Batra et al. | |
| 2001/0021909 A1* | 9/2001 | Shimomura et al. | 704/275 |
| 2004/0172252 A1* | 9/2004 | Aoki et al. | 704/270 |
| 2005/0240412 A1* | 10/2005 | Fujita | 704/270 |
| 2007/0073538 A1* | 3/2007 | Rifkin | 704/236 |
| 2007/0266020 A1 | 11/2007 | Case et al. | |
| 2008/0071540 A1* | 3/2008 | Nakano et al. | 704/251 |
| 2009/0177323 A1* | 7/2009 | Ziegler et al. | 700/259 |
| 2010/0082340 A1* | 4/2010 | Nakadai et al. | 704/233 |
| 2012/0232891 A1* | 9/2012 | Aoyama et al. | 704/231 |
| 2012/0278066 A1* | 11/2012 | Kim et al. | 704/9 |

OTHER PUBLICATIONS

Sahay, S., et al., "Collaborative Information Access: A Conversational Search Approach," ICCBR Workshop on Reasoning from Experiences on the Web, Jul. 2009.

Fink, M., et al., "Social- and Interactive-Television Applications Based on Real-Time Ambient-Audio Identification," May 2006.

\* cited by examiner

*Primary Examiner* — Jason Holloway
(74) *Attorney, Agent, or Firm* — McDonnell Boehnen Hulbert & Berghoff LLP (57) ABSTRACT

Methods and systems are provided that may help a robot provide contextual filtering of environmental information, such that the robot may be able to base its actions upon environmental data that is relevant to the device's context.

20 Claims, 6 Drawing Sheets

METHODS AND SYSTEMS FOR ROBOTIC PROACTIVE INFORMATIONAL RETRIEVAL FROM AMBIENT CONTEXT

CROSS-REFERENCE TO RELATED APPLICATIONS

The present disclosure claims priority to U.S. Patent Application No. 61/483,295 filed on May 6, 2011 and to U.S. Patent Application No. 61/593,095 filed on Jan. 31, 2012, the entire contents of which are herein incorporated by reference.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud."

Cloud computing has been referred to as "client-server computing," however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

Through "cloud computing," data across multiple servers can be synchronized around the world allowing for collaborative work on one file or project, from multiple users around the world, for example. To illustrate, a user may open a browser and connect to a host of web servers that run user interface software that collect commands from the user and interpret the commands into commands on the servers. The servers may then handle the computing based on these commands, and can either store or retrieve information from database servers or file servers and display an updated page to the user.

SUMMARY

In one aspect, an example method involves: (a) determining, by a robotic device that includes one or more sensory devices, a context of the robotic device; (b) receiving an environmental input via at least one of the sensory devices, wherein the environmental input includes environmental data that relates to an environment of the robotic device; (c) determining that the environmental data is relevant to the context of the robotic device; and (d) in response to determining that the environmental data is relevant to the context of the robotic device, performing, by the robotic device, an output function based on the environmental data.

In another aspect, a computer readable medium may have stored thereon instructions that are executable by a robotic device that includes at least one sensory device. The instructions are executable to cause the robotic device to perform functions comprising: (a) determining, by a robotic device that includes one or more sensory devices, a context of the robotic device; (b) receiving an environmental input via at least one of the sensory devices, wherein the environmental input includes environmental data that relates to an environment of the robotic device; (c) determining, based on predefined concept data for the context of the robotic device, that the environmental data is relevant to the context of the robotic device; and (d) in response to determining that the environmental data is relevant to the context of the robotic device, performing, by the robotic device, an output function based on the environmental data.

In yet another aspect, an example robotic device includes: (i) one or more processors; (ii) one or more sensors coupled to the one or more processors and configured to capture environmental data about an environment in a vicinity of the sensor or a user; and (iii) memory including instructions stored thereon executable by the one or more processors to perform functions comprising: (a) determining a context of the robotic device; (b) receiving an environmental input via at least one of the sensors, wherein the environmental input includes environmental data that relates to an environment of the robotic device; (c) determining, based on predefined concept data for the context of the robotic device, that the environmental data is relevant to the context of the robotic device; and (d) in response to determining that the environmental data is relevant to the context of the robotic device, determining an output function based on the environmental data.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying Figures, which form a part hereof. In the Figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Example embodiments may help to provide for contextual filtering by a robotic device. For example, a robotic device (which may also be referred to as a robot) can determine its context based on sensory data relating to its environment (e.g., "environmental data") and/or based on other information. Such environmental data may be acquired via various types of sensors and may take various forms, such as audio that includes speech from nearby persons and/or images that capture text or objects in the vicinity of the device, for example. The robotic device may analyze and determine what environmental data is relevant to the device's context and/or what environmental data is not relevant. Accordingly, the robotic device may filter out environmental data that is not relevant to the device's context, and take appropriate actions based on the environmental data that is relevant.

For instance, consider the scenario where a robotic device is located in a lecture hall where a presenter is discussing an algorithm for robotic intelligence using neuronet building blocks. The device may therefore determine that its context is "Robotic Learning" or "discourse related to robotic learning." Further, a side conversation is also occurring between persons sitting next to the robotic device in the lecture hall, which relates to an upcoming football game. In this scenario, the robotic device may record or be provided with audio data that includes the speech relating to robotic intelligence, as well as the speech relating to the football game. The robotic device may therefore determine that the speech related to robotic intelligence is relevant to the context of "Robotic Learning," while the speech related to the football game is not. Accordingly, the device may filter out speech relating to the football game and/or may act upon speech related to robotic intelligence. For example, a search query may be formulated based on words and/or phrases included in the speech related to robotic intelligence, so that the robotic device can display the search results or information based on the search results, on its display. Other examples are also possible.

To facilitate collection of environmental data, a robotic device may be configured for real-time data sensing or gathering. For example, a robotic device may acquire audio data from its environment and/or image data that captures aspects of its environment (e.g., still images and/or video). The robotic device may further have a real-time textual data sensing and gathering capabilities. Such capabilities may be provided by speech-to-text functionality, document recognition and processing functionality and electronic data-transmission detection and processing. Further, such capabilities may be utilized to extract textual information from environmental data, such as applying a speech-to-text process to audio data and/or by recognizing text in image data (e.g., text in a document, text on a nearby LCD display, text on a nearby sign, etc.).

Further described herein are examples of software systems and related hardware systems, including a basic application robot and an interface for data and/or command input for the robot for operating sensing hardware (audio, text recognition, electronic data processing, visual), processing sensed data obtained, engaging with a remote database or cloud for relational information, and providing interfaces that allow for user interaction.

The methods described herein may be provided in a form of instructions stored on a non-transitory, computer readable medium, that when executed by a computing device, causes the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable media, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as means for performing functions of any of the methods described herein (or any portions of the methods described herein).

Herein, a robotic device or robot may be a device that has a computing ability to sense its environment via various sensors and/or to interact with its surroundings with an actuation capability (e.g., electromechanical capabilities). As such, a user device may be configured as a robot including various sensors and devices in the forms of modules. Further, different modules may be added or removed from robot depending upon the particular implementation. In some examples, a robot may be configured to receive a second device (e.g., via an interface or "dock"), such as mobile phone, that may be configured to function as an accessory or a "brain" of the robot.

Methods and systems disclosed herein may involve user interactions over the cloud. Herein, such interactions may involve communications between a robotic device and cloud computing devices. Cloud-based computing generally refers to networked computer architectures in which application execution and storage may be divided, to some extent, between user and server devices.

In examples described herein, a robot may interact with the cloud to perform any number of actions, such as to share information with other cloud computing devices. Within examples, a robot may interact with a user in a manner that is based upon many types of received information. A robot may access a user device to determine or identify information about a user or related to the ambient environment, which may be, for example, a meeting. A robot may further receive data associated with the ambient environment from one or more sources, such as data received from sensors and/or through electronic inputs.

In particular, the robot may gain access to information regarding the immediate environment or circumstances, through local sensing as well as a cloud and/or a network. The robot thus would be linked to a cloud to gain access to information stored in the cloud, extracting that information depending upon analysis of inputs being received by the robot.

1. Cloud Computing Architecture

Figure 1:
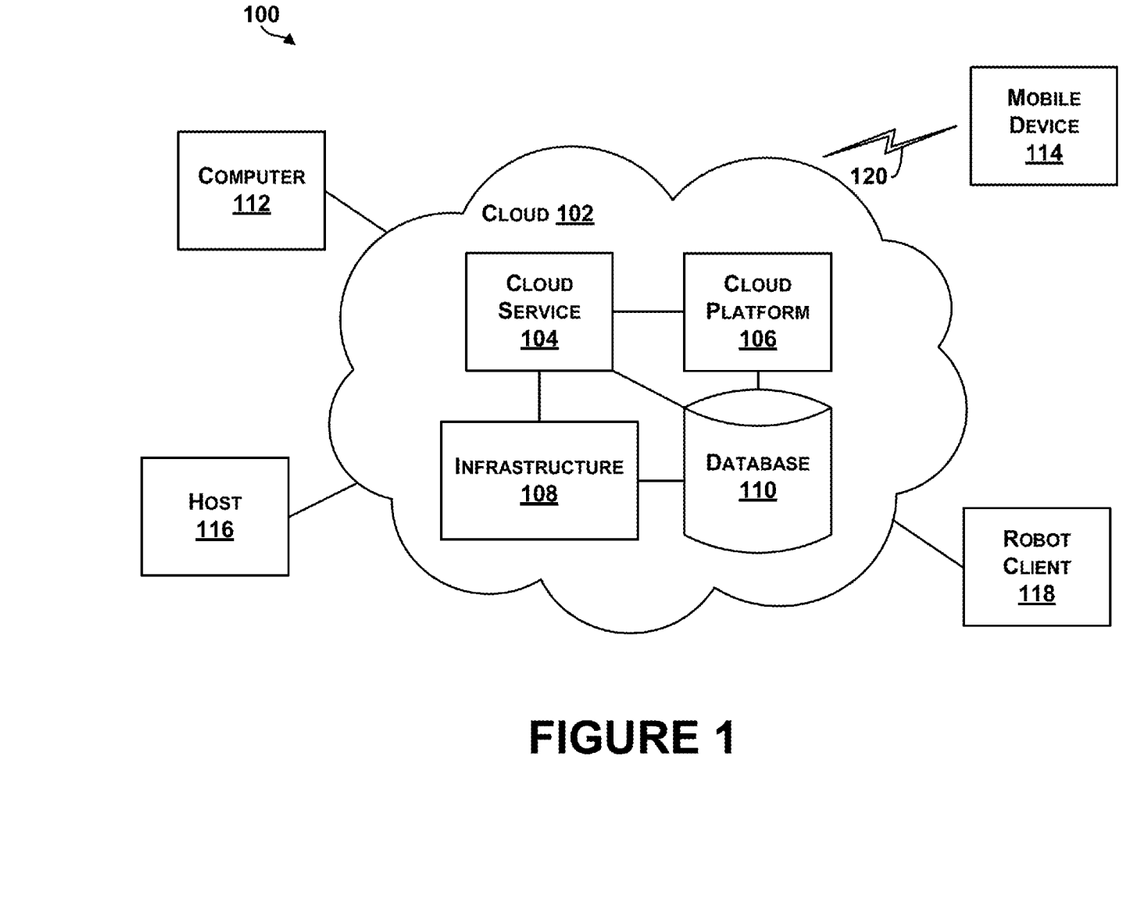
FIG. 1 is an example system for cloud-based computing.

Referring now to the Figures, FIG. 1 is an example system 100 for cloud-based computing. Cloud-based computing generally refers to networked computer architectures in which application execution and storage may be divided, to some extent, between client and server devices. A "cloud" may refer to a service or group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing user devices to download at least some of this data and program logic as needed for execution at the user devices. In some examples, downloaded data and program logic can be tailored to capabilities of specific user devices (e.g., a personal computer, tablet, or mobile phone, or robot) accessing the cloud-based application. In addition, dividing application execution and storage between the client and server devices allows more processing to be performed by the server devices taking advantage of server devices' processing power and capability, for example.

Cloud-based computing can also refer to distributed computing architectures in which data and program logic for a cloud-based application are shared between one or more user devices and/or server devices on a near real-time basis. Parts of this data and program logic may be dynamically delivered, as needed or otherwise, to various clients accessing the cloud-based application. Details of the architecture may be transparent to users of user devices. Thus, a PC user or robot user device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from user devices. The cloud platform 106 may include a front end of the cloud and may be coupled to the cloud service 104 to perform functions to interact with user devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of user devices coupled to or configured to be capable of communicating with components of the cloud 102. For example, a computer 112, a mobile device 114, a host 116, and a robot client 118 are shown coupled to the cloud 102. Of course, more or fewer user devices may be coupled to the cloud 102. In addition, different types of user devices may be coupled to the cloud 102. For example, any of the user devices may generally comprise a display system, memory, and a processor.

The computer 112 may be any type of computing device (e.g., PC, laptop computer), and the mobile device 114 may be any type of mobile computing device (e.g., laptop, mobile telephone, cellular telephone).

The host 116 may be any type of computing device or transmitter including a laptop computer, a mobile telephone, that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the user devices may include additional components. For example, the robot client 118 may include one or more sensors, such as a gyroscope or an accelerometer, to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the user devices may include an integrated user-interface (UI) that allows a user to interact with the device. For example, the robot client 118 may include various buttons and/or a touchscreen interface that allow a user to provide input. As another example, the robot user device 118 may include a microphone configured to receive voice commands from a user. Furthermore, the robot client 118 may include one or more interfaces that allow various types of user-interface devices to be connected to the robot client 118.

In FIG. 1, communication links between user devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the user devices may communicate with the cloud 102. Access points may take various forms, for example, an access point may take the form of a wireless access point (WAP) or wireless router. As another example, if a user device connects using a cellular air-interface protocol, such as a CDMA or GSM protocol, an access point may be a base station in a cellular network that provides Internet connectivity via the cellular network.

As such, the user devices may include a wired or wireless network interface through which the user devices can connect to the cloud 102 (or access points). As an example, the user devices may be configured to use one or more protocols such as 802.11, 802.16 (WiMAX), LTE, GSM, GPRS, CDMA, EV-DO, and/or HSPDA, among others. Furthermore, the user devices may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. Example Robot Architecture

Figure 2A:
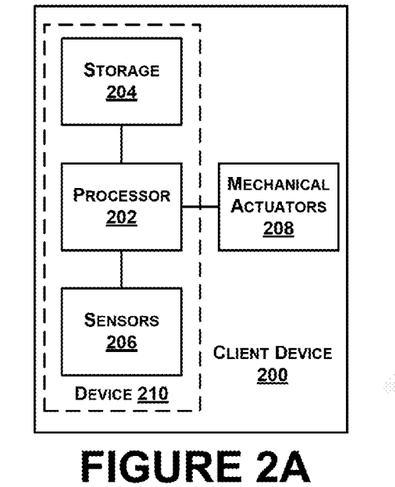
FIG. 2A illustrates an example user device.

FIG. 2A illustrates an example user device 200. In one example, the user device 200 is configured as a robot. In some examples, a robot may contain computer hardware, such as a processor 202, memory or storage 204, and sensors 206. For example, a robot controller (e.g., processor 202, computing system, sensors 206) may all be custom-designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include smoke sensors, light sensors, radio sensors, infrared sensors, microphones, speakers, gyroscopes, accelerometers, a camera, radar, capacitive sensors and touch sensors.

The user device 200 may also have components or devices that allow the user device 200 to interact with its environment. For example, the user device 200 may have mechanical actuators 208, such as motors, wheels 222, movable arms 220, that enable the user device 200 to move or interact with the environment.

In some examples, various sensors and devices on the user device 200 may be modules. Different modules may be added or removed from a user device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the user device 200 may be configured to receive a device, such as device 210, that includes the processor 202, the storage 204, and the sensors 206. For example, the user device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud.

In some examples, the user device 200 may be coupled to a mobile or cellular telephone to provide additional sensing capabilities. The cellular phone may not be physically attached to the robot, but may be coupled to the robot wirelessly. For example, a low cost robot may omit a direct connection to the Internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the user device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, that are included within the device 210.

Figure 2B:
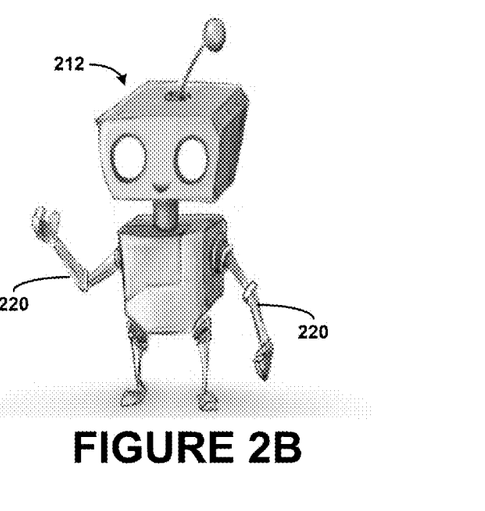
FIG. 2B illustrates a graphical example of a robot.

FIG. 2B illustrates a graphical example of a robot 212. In FIG. 2B, the robot 212 is shown as a mechanical form of a humanoid including arms, legs, and a head. The robot 212 may be configured to receive any number of modules or components, such as a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
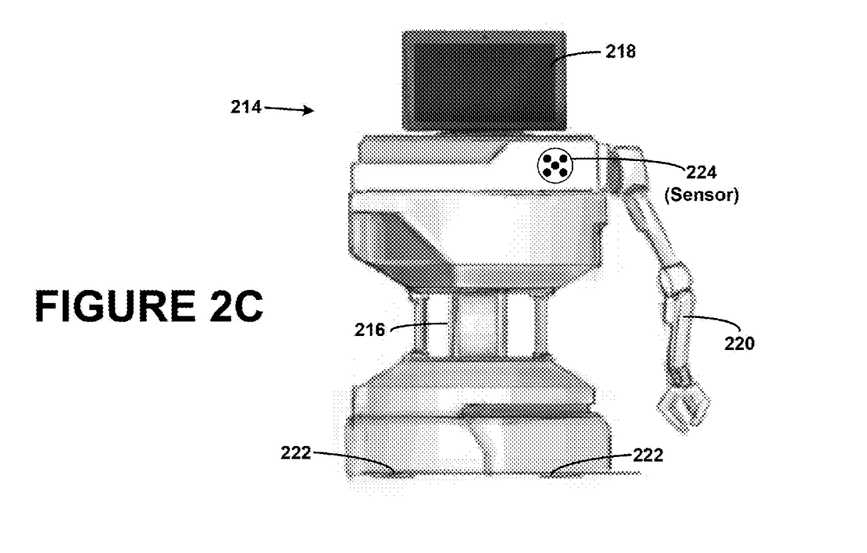
FIG. 2C illustrates another example of a robot.

FIG. 2C illustrates another example of a robot 214. The robot 214 includes a computing device 216, and a mechanical actuator 220. In this example, the computing device 216 may be a laptop computer or the equivalent thereof. Here, the robot has been provided with a video display or monitor 218, which may be coupled to sensors 224. The video monitor 218 could, as here, be used to project an image relating to the personality then being adopted by the robot 214. The sensors 224 may include a camera, infrared projectors, and other motion sensing or vision sensing elements. Further, in some embodiments, a robot may also include range cameras that are configured to provide three-dimensional information relating to the robot's environment. Audio sensors may be provided, such as a microphone, microphone array or distributed microphone pick-ups. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management), to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio). A robot operating system may include publish and subscribe functionality, and may also include functionality to control components of the robot, such as head tracking, base movement (e.g., velocity control, navigation framework).

3. Robot and Cloud Interaction

Figure 3:
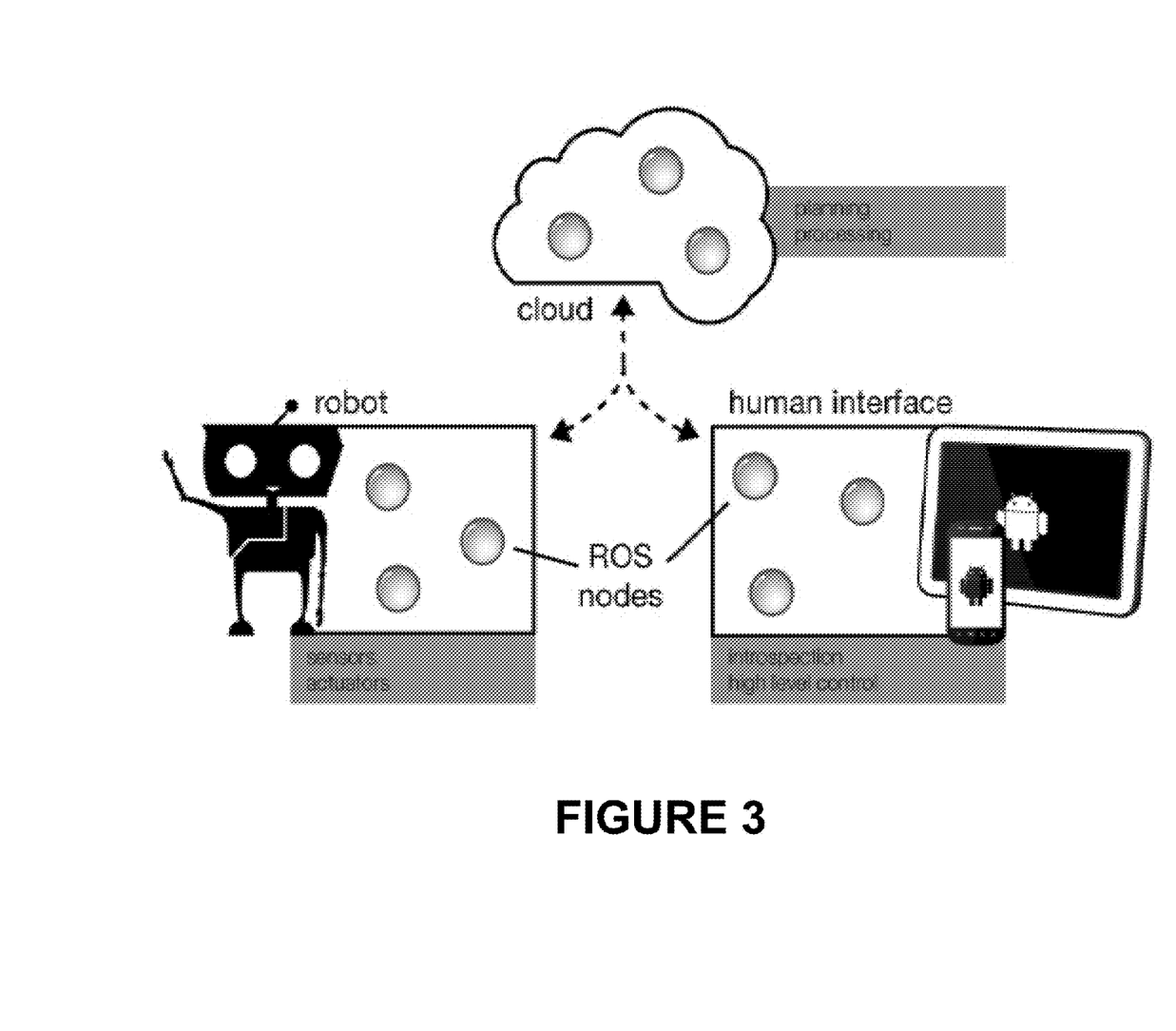
FIG. 3 illustrates an example of a conceptual robot-cloud interaction.

FIG. 3 illustrates an example of a robot-cloud interaction. A robot, such as a robot described and illustrated in FIG. 2A-C, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, may be provided to the cloud, which can process the outputs to enable the robot to perform functions. The cloud may process a camera feed, for example, to determine a location of a robot, perform object recognition, read a visual display or document, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, voice recognition, text recognition. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the Internet.

Figure 4:
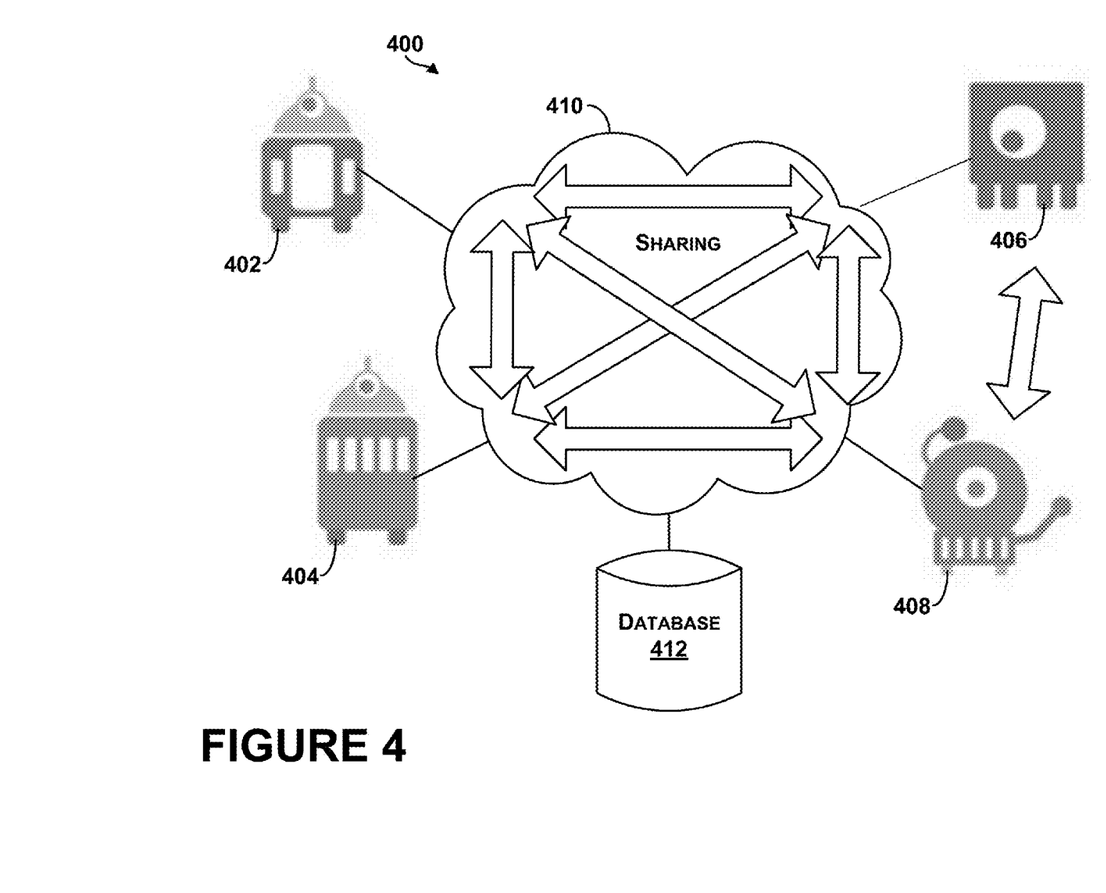
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be compiled into a larger data set. For example, the robot 402 may take a picture of a slide being projected or displayed during a presentation, and upload the picture to the cloud 410. An object recognition program in the cloud 410 may be configured to identify information or data in the picture, and provide data results to all the robots connected to the cloud 410 about the results, as well as possibly about other characteristics of the results. Thus, every robot may be able to know attributes of something set forth in a photo uploaded by the robot 402.

The robots 402, 404, 406 and 408 may perform any number of actions with an area, people, and/or other robots. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. For example, the robot 402 may be in one part of a room and pick up one conversation, and can inform the other robots 404, 406, and 408 in the room, or elsewhere (through the cloud 410) of that conversation. Each robot 402, 404, 406, and 408 will have access to real-time up-to-date data. In another example, the robot 404 can download data indicating images seen by the other robots 402, 406, and 408 (documents, projections, monitor screens) to help the robot 404 identify data for a possible query using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot. Sharing and adaptation capabilities enable a variety of applications based on a variety of inputs/data received from the robots 402, 404, 406, and 408.

In one example, the cloud 410 may include, store, or provide access to a database 412 of information, and the database 412 may be accessible by all the robots 402, 404, 406, and 408. The database 412 may include information serving to identify images sensed, and details of the images (e.g., mass, properties, shape, instructions for use, historical content, any detail that may be associated with the object) that can be accessed by the robots 402, 404, 406, and 408 to perform object recognition.

In addition, the database 412 may include information about images that can be used to distinguish objects or things in the image. For example, the database 412 may include general information regarding an object (e.g., such as a computer), and additionally, information regarding a specific computer (e.g., a model number, details or technical specifications of a specific model). Each image may include information accessible in the database 412 about object details in the image, object distinguishing characteristics, or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a melon), and to receive information that may distinguish between specific objects (e.g., two different computers).

Note that the foregoing discussion likewise translates to data captured by audio and textual means. Words and phrases perform similar target functions to the foregoing "objects."

The database 412 may be accessible by all robots through the cloud 410 (or alternatively directly accessible by all robots without communication through the cloud 410). The database 412 may thus be a shared knowledge-base that is stored in the cloud 410.

Thus, in some examples, robots may share new or learned data and information through the cloud 410. The cloud 410 may have a server that stores robot learned activities resulting in a shared knowledge-base of data and heuristics for interactions (e.g., a robot "app store"). Specifically, a given robot may perform actions and build a query, and then the robot can upload the query to the cloud 410 to obtain knowledge and information, which can then be shared with all other robots. In this example, a transportation of the given robot's "consciousness" can be made through the cloud 410 from one robot to another.

Thus, within examples, the robots 402, 404, 406, and 408 may share information through the cloud 410, and may access the database 412.

4. Contextual Filtering

As mentioned, robots (and possibly other types of user computing devices) may be configured to contextually filter environmental data so as to act upon environmental data that is relevant to the device's context.

The robot may be provided with one or more sensory inputs, or data inputs. These could be in the form of one or more audio inputs for detecting spoken words or relevant sounds in the ambient environment. Speech recognition software may be used to convert spoken words or dialogue into a machine-readable or usable form, such as text input in real time. Data inputs could further include text resolution hardware and software. For example, the robotic device may be operable to analyze image data capturing its environment and read text that is printed in a document or displayed on a graphic display in the device's environment. Further, the robotic device text resolution software may be implemented so as to analyze text from electronic documents, such as incoming e-mails, instant messages (IMs), word processing applications, among other possibilities.

The sensed data may be filtered, parsed or the like, in order to establish some basis for formulating a potentially useful query or query. In particular, sensed data may be analyzed to determine whether or not it relates to the device's context (e.g., to the current environmental situation in which the device is operating).

For example, the filtering may involve categorizing and/or weighing the various sensed data, and determining the relevancy of the data to the current context. The current context may be determined, for example, based on some overarching aspect or theme of event or features in the device's environment. For instance, the context of the meeting may be "Robotic Learning." A presenter may be discussing an algorithm for robotic intelligence using neuronet building blocks, while a conversation between certain participants has devolved into a debate on an upcoming football game. The robot would preferably filter out the football game as "noise," and focus upon the robotic neuronet building blocks discourse for data to formulate a query. Filtering may be customizable by a user, to allow refinement, or, alternatively, expansion of queries and/or retrieved relational information. The robot could, for instance, respond to multiple discourses occurring in parallel.

Parsing and/or filtering may involve identifying and/or eliminating noise or low-value words and phrases, as well as separating sensed data into smaller components. In the case of audio or textual phrases, this may be based upon matching to concepts. The processing of sensed data may operate according to an algorithm designed to identify phrases of up to a predetermined length, and/or comprising words indicative of concepts. "Fuzzy logic" may be involved in filtering and formulating the query or queries. This could include a database of predefined concepts. From a matching of contextual concepts drawn from the phrases, one or more queries may result. Of course, other mechanisms, processes and methods could be employed to generate the query or queries.

Figure 5:
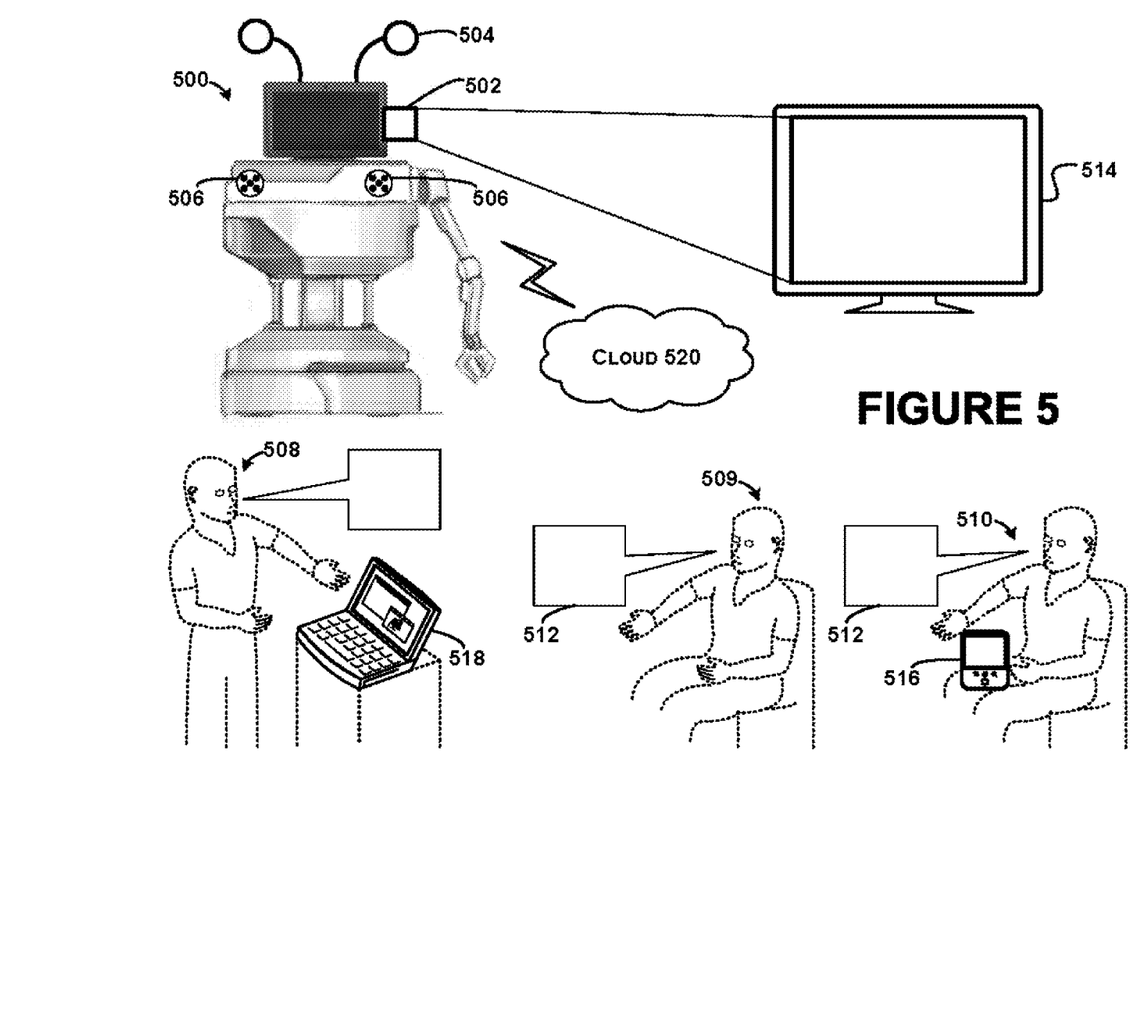
FIG. 5 is a block diagram of an example system including a robot and a cloud computing system, in which an example embodiment may be implemented.

FIG. 5 is a block diagram of an example system including a robot and a cloud computing system, in which an example embodiment may be implemented. FIG. 5 presents an embodiment that, for example, could be used with the systems 100 and 400, for example, and may be performed by a device, such as a device illustrated in FIGS. 1-4, or components of the device. Robot 500 would include standard computational equipment such as CPU, memory, storage and software for various applications and operating system. Robot 500 need not be mobile, nor does it have to use appendages. In this embodiment, it need only be a robotic device, which can simply be embodied in a device or dissociated but interrelated devices serving to sense the ambient environment, and then process the sensed data in accordance with this disclosure.

Robot 500 may be provided with a visual sensing capability, as in the form of a camera or video monitor 502, in order to acquire image data of its environment. The robot 500 may apply various text-recognition techniques to extract textual environmental data from the image data. Additionally or alternatively, the robot 500 may apply image processing techniques, such as various object-recognition techniques, visual search techniques, and/or facial-recognition techniques to extract visual environmental data from the image data.

In a further aspect, audio sensors 506 may be used to collect sound or audio data. These could be a microphone or microphone array that is integrated in or attached to the robotic device, or that is otherwise arranged to sense sound in the environment in which the robot 500 is operating.

In FIG. 5, a robot 500 is shown as operating in an environment where a meeting is occurring. In the meeting, multiple individuals 508, 509 and 510 are interacting. This includes spoken words and sounds (indicated by word balloons 512), and a projected display on a video monitor 514. The video display could be of images, text and so forth. Data could be further obtained through accessing a user device 516, such as a PDA, smart phone, or the like, as well as a PC, laptop or other computer 518.

The environmental input that is sensed and captured from the environment may be utilized by robot 500 and/or may be communicated to the cloud to determine a context of the robot 500. For example, the robot 500 and/or a cloud computing device may glean from the spoken discourse that the speaker 508 is addressing a topic on the portrayal of simians in popular movies. The robot 500 and/or a cloud computing device may also analyze visual data (e.g., still images or video capturing its surroundings) and detect that monitor 514 is displaying an image from a movie entitled "Escape from a World Ruled by Apes." Based on this information, the robot 500 may determine its context to be the "discussion of simians in popular movies." Note that this determination may simply involve the robot 500 sending the sensed data to a cloud computing device and receiving an indication of the context in response, or might involve the robot 500 performing the analysis to derive its context from the sensed data and/or other information.

In a further aspect, note that robot 500 and/or a cloud computing may use various techniques to determine the robot's context, which may be based on other types of information in addition or in the alternative to sensed data from the robot's environment. Additional examples for determining a device's context are provided in section 5 below.

Additionally, robot 500 and/or a cloud computing device may analyze the environmental input that is sensed and/or captured from a robotic device's environment, in view of the device's context, to extract/filter data that may be useful in formulating a query to obtain relational information to what has been sensed. For example, one of the individuals 509 may pose a question regarding human-like emotions in the portrayal of simians. The robot may receive and perform speech-to-text processing on environmental audio data that includes this question, and then determine that this question (or words or phrases therefrom) are relevant to the current context of a "discussion of simians in popular movies." As a result, robot 500 may formulate a search query based on this question (or relevant words or phrases therefrom); e.g., to search for other movies that have portrayed simians and/or emotions shown by simians therein.

A query may then be sent to an informational resource, shown in this embodiment as cloud 520. "Sent" is used in the sense of an electronic interaction or interchange, whereby the query is used to obtain some kind of matching or logically related relational information in response to the query. The relational information obtained, or content, is then returned to the robot 500. In this example, it may be a clip from a movie about a prehistoric ape that runs wild in a large city, showing the facial expressions of the ape in the context of interacting with a human. The robot can then interject this clip or content into the discourse in real-time, such as initiating a video feed to the laptop 518 of the presenter 508, to allow the presenter 508 to decide whether to display the clip on monitor 514. Alternatively, the clip could be automatically displayed on the monitor 514, on a display of robot 500, and/or on a display of user device 516. Besides displaying relational information visually, textually, or audibly, the robot may also manually provide the information, as by retrieving a document or thing, and providing that physical item to a user.

In a further aspect, robot 500 may communicate with a user device 516 either directly (using wired or wireless connections) or through a cloud 520. For example, the user device 516 may be coupled to the cloud 520 (using wired or wireless connections), and the robot 500 may access the user device 516 through the cloud 520.

The user device 516 may be any of a computer (desktop or laptop), a mobile phone, a cellular telephone, a personal digital assistant (PDA), a tablet computer, or other mobile computing devices. Still further, the user device 516 may include other devices such as a digital video recorder (DVR), television computing devices, or any type of cloud computing device or device with connectivity to the cloud.

Figure 6:
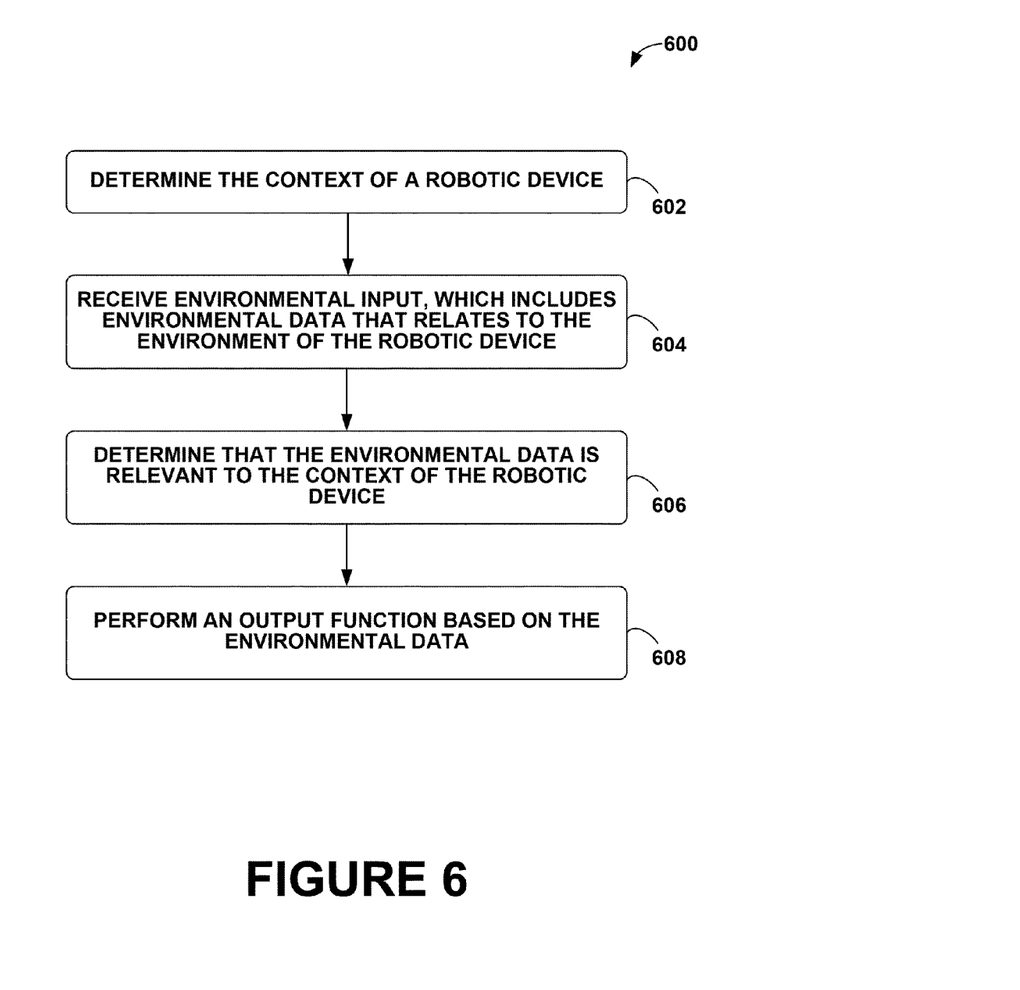
FIG. 6 is a flow chart illustrating a method according to an example embodiment, which may be carried out by a computing device.

FIG. 6 is a flow chart illustrating a method according to an example embodiment, which may be carried out by a robotic device and/or another computing device or devices (e.g., one or more cloud computing devices), such as those illustrated in FIGS. 1 to 5. The example method 600 may include one or more operations, functions, or actions as illustrated by one or more of blocks 602-610. Although the blocks are illustrated in a sequential order, these blocks may also be performed in parallel, and/or in a different order than those described herein, unless dictated by a necessary earlier step. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 600 and other processes and methods disclosed herein, each block in FIG. 6 may represent circuitry that is wired to perform the specific logical functions in the process.

At block 602, method 600 involves a computing device (e.g., a robotic device) determining the context of the robotic device. Various techniques may be used to determine the context of the robotic device, such as those described above in reference to FIG. 5, and below in section 5 below.

Method 600 further involves a computing device receiving environmental input, which includes environmental data that relates to the environment of the robotic device, as shown by block 604. In an example, a robot 500 may receive and/or capture image data (e.g., video or still images). Such image data may be captured by any number of sensors, such as a camera (still pictures or video feeds) or an infrared projector. A robot may also capture and/or receive audio input, electronic data, and/or other forms of data related to the robot's environment (e.g., data from proximity sensors, temperature data, etc.).

At block 606 of method 600, the computing device determines that the environmental data is relevant to the context of the robotic device. Then, in response to determining that the environmental data is relevant to the context of the robotic device, the robotic device performs an output function based on the environmental data, as shown by block 608.

At block 606, a robotic device and/or a cloud computing device may use various techniques to determine whether or not particular environmental data is relevant to the context of the robotic device. For example, a robotic device may execute program instruction to parse or filter the environmental data based on predefined filter criteria for the particular context.

Such contextual filter criteria may specify, for example, certain words or phrases that, when spoken in the device's environment, are considered relevant to the particular context. As another example, contextual filter criteria may specify or certain objects, features, or persons, that when present in the device's environment, are considered relevant to the particular context.

At block 608, a robotic device may perform various output functions. For example, the robotic device may formulate a search query based on the relevant environmental data and/or request a search that is based at least in part on the detected environmental information (e.g., by sending a search request to the cloud). The output function may further involve the robotic device receiving search results that relate to the detected environmental information and initiating an action based on the received search results. For example, the robotic device may automatically display the search results in its graphic display or send the search results to another computing device that is associated with the robotic device, for display by the other computing device.

In an example embodiment, the search query or queries may be sent to the cloud (e.g., a cloud computing device or devices) so that a search can be performed. In the cloud, the search query may be processed by a cloud-based computing system, which uses an informational or resource database to perform a search. This may involve finding matching information, as well as logically related information to the query, referred to collectively herein as "relational information," to the real-time discussion. The relational information is then retrieved by the robot, and interjected or presented, into the discussion in real-time, as by displaying or otherwise delivering the relational information to the user or users (the individuals participating in the discussion). All of the data sensing and gathering, query formulation, query processing and retrieval, and presentation are most preferably accomplished by the robot without any command input from the user. In this sense, the robotic device may be considered to be operating proactively to the sensed environmental data.

As another example of an output function that may be performed at block 608, the robotic device may interact with an object or person in the environment of the robotic device. For example, the robotic device may perform physical actions such moving to a file cabinet and retrieving a paper file that relates to the environmental data. Other examples of output functions are also possible.

5. Context Determination

Various techniques may be used to determine the context of a robotic device. For example, a robotic device and/or a cloud-based server may be configured to use environmental data that is sensed by a robotic device and/or other devices that are in the vicinity of the robotic device. Other information may also be utilized to determine context.

In an example embodiment, a "context" of a robotic device may be determined based on various "context signals" or combinations of context signals. A context signal may be any signal that provides a measurement or otherwise provides information pertaining to the state or the environment associated with a certain subject (e.g., with a certain user, device, event, etc.). For example, a robotic device and/or a cloud-based server may be configured to use environmental data that is sensed by a robotic device and/or other devices that are in the vicinity of the robotic device. Other information may also be utilized to determine context.

Note that a certain user account or user accounts may be associated with a robotic device (e.g., a user account or user profile for the owner of the device). Therefore, information from such a user account or otherwise related to an associated user may also be used to determine the context of a robotic device. For example, context signals may be obtained or derived from sources such as a user's computer-based calendar, blog, webpage, social network account, and/or e-mail account, among others. For instance, context signals may be provided by user's calendar entries, e-mail messages, and social-network profile, messages, posts, and/or tweets. Further, in some embodiments, similar context signals may be obtained or derived from other users' computer-based calendars, blogs, webpages, social network accounts, and/or e-mail accounts, who are listed in a user's electronic contact list, listed as a "friend" in a user's social network, or otherwise associated with the user (provided such users have opted in to share such context information).

In some instances, a device's context may be a state associated with a particular context signals or set of context signals. However, a context may also be abstracted from the context signals upon which it is based. As such, a "context" may also be a data-based description or characterization of an environment or state that is determined or derived from one or more context-signals. For example, contexts may take the form of data indicating environment or state information such as "at home," "at work," "in a car," "indoors," "outside," "in a meeting," etc. Furthermore, a context may be a qualitative or quantitative indication that is determined based on one or more context signals. For example, context signals indicating that that it is 6:30 AM on a weekday and that a user is located at their home may be used to determine the context that the user is "getting ready for work."

Many types of information, from many different sources, may be used as context signals or provide information that can be used to determine the context of a robotic device. For example, context signals may include: (a) the current time, (b) the current date, (c) the current day of the week, (d) the current month, (e) the current season, (f) a time of a future event or future context, (g) a date of a future event or future context, (h) a day of the week of a future event or future context, (i) a month of a future event or future context, (j) a season of a future event or future context, (k) a time of a past event or past context, (l) a date of a past event or past context, (m) a day of the week of a past event or past context, (n) a month of a past event or past context, (o) a season of a past event or past context, ambient temperature near the device, (p) a current, future, and/or past weather forecast at or near the device's location, (q) information on user's calendar, such as information regarding events or statuses of a user or a user's friends, (r) information accessible via a user's social networking account, such as information relating a user's status, statuses of a user's friends in a social network group, and/or communications between the user and the users friends, (s) noise level or any recognizable sounds detected in the device's environment, (t) items that are currently detected in the device's environment, (u) items that have been detected in the past in the device's environment, (v) items that other devices associated with a robotic device, (w) information derived from cross-referencing any two or more of: information on a user's calendar, information available via a user's social networking account, and/or other context signals or sources of context information, (x) health statistics or characterizations of a user's current health (e.g., whether a user has a fever or whether a user just woke up from being asleep), and (y) a user's recent context as determined from sensors on or near the user and/or other sources of context information, (z) a current location, (aa) a past location, and/or (bb) a future location, among others. Those skilled in the art will understand that the above list of possible context signals and sources of context information is not intended to be limiting, and that other context signals and/or sources of context information are possible in addition, or in the alternative, to those listed above.

It should be understood that the above examples of contexts, context signals, techniques for determining a context, and/or techniques for using context when selecting an advertisement are provided for illustrative purposes, and are not intended to be limiting. Other examples and/or techniques are also possible.

6. Conclusion

It should be understood that arrangements described herein are for purposes of example only. As such, those skilled in the art will appreciate that other arrangements and other elements (e.g., machines, interfaces, functions, orders, and groupings of functions) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

I claim:

1. A method comprising:
    determining, by a robotic device that includes one or more sensory devices, a context of the robotic device;
    receiving an environmental input via at least one of the sensory devices, wherein the environmental input includes first environmental data received from a first source and second environmental data received from a second source, and wherein the first source and the second source are within an environment of the robotic device;
    determining that the first environmental data is relevant to the context of the robotic device and the second environmental data is not relevant to the context of the robotic device;
    in response to determining that the first environmental data is relevant to the context of the robotic device, performing, by the robotic device, an output function based on the first environmental data comprising:
        formulating a query based at least on the first environmental data that is relevant to the context;
        based on the query, searching for relational information corresponding to the first environmental data that is relevant to the context; and
        receiving the relational information corresponding to the first environmental data that is relevant to the context.

2. The method of claim 1, wherein the first environmental data comprises audio data based on speech from the first source and the second environmental data comprises audio data based on speech from the second source.

3. The method of claim 1, wherein the first environmental data comprises video data received from the first source and the second environmental data comprises audio data received from the second source.

4. The method of claim 1, wherein performing the output function based on the first environmental data further comprises initiating a video feed to a remote computing device for displaying the relational information.

5. The method of claim 4, wherein performing the output function further comprises automatically displaying the relational information on a graphic display associated with the remote computing device.

6. The method of claim 1, wherein the output function comprises an interaction by the robotic device with an object in the environment of the robotic device.

7. The method of claim 1, wherein the first environmental data includes audio data received from the first source, and wherein determining that the first environmental data is relevant to the context of the robotic device further comprises:
    applying a speech-to-text process on the audio data received from the first source;
    based on the applied speech-to-text process, determining text from the audio data; and
    determining that the text is relevant to the context of the robotic device.

8. The method of claim 1, wherein determining that the first environmental data is relevant to the context of the robotic device comprises determining that the first environmental data includes visual environmental data, wherein the visual environmental data comprises text, and wherein the text is relevant to the context of the robotic device.

9. A non-transitory computer readable medium having stored therein instructions executable by a robotic device that includes at least one sensory device to cause the robotic device to perform functions comprising:
    determining, by a robotic device that includes one or more sensory devices, a context of the robotic device;
    receiving an environmental input via at least one of the sensory devices, wherein the environmental input includes first environmental data received from a first source and second environmental data received from a second source, and wherein the first source and the second source are in an environment of the robotic device;
    determining that the first environmental data is relevant to the context of the robotic device and the second environmental data is not relevant to the context of the robotic device;
    in response to determining that the first environmental data is relevant to the context of the robotic device, performing, by the robotic device, an output function based on the first environmental data comprising:
        formulating a query based at least on the first environmental data that is relevant to the context;
        based on the query, searching for relational information corresponding to the first environmental data that is relevant to the context; and
        receiving the relational information corresponding to the first environmental data that is relevant to the context.

10. The non-transitory computer readable medium of claim 9, wherein the first environmental data comprises audio data based on speech from the first source and the second environmental data comprises audio data based on speech from the second source.

11. The non-transitory computer readable medium of claim 9, wherein the first environmental data comprises video data received from the first source and the second environmental data comprises audio data received from the second source.

12. The non-transitory computer readable medium of claim 9, wherein performing the output function based on the first environmental data further comprises initiating a video feed to a remote computing device and displaying the relational information on a graphic display associated with the remote computing device.

13. The non-transitory computer readable medium of claim 9, wherein the output function comprises an interaction by the robotic device with an object in the environment of the robotic device.

14. The non-transitory computer readable medium of claim 9, wherein the first environmental data includes audio data from the first source, and wherein determining that the first environmental data is relevant to the context of the robotic device further comprises:
  applying a speech-to-text process on the audio data;
  based on the applied speech-to-text process, determining text from the audio data received from the first source; and
  determining that the text is relevant to the context of the robotic device.

15. The non-transitory computer readable medium of claim 9, wherein determining that the first environmental data is relevant to the context of the robotic device comprises determining that the first environmental data includes visual environmental data, wherein the visual environmental data comprises text, and wherein the text is relevant to the context of the robotic device.

16. A robotic device comprising:
  one or more processors;
  one or more sensors coupled to the one or more processors and configured to capture environmental data about an environment of the robotic device; and
  memory including instructions stored thereon executable by the one or more processors to perform functions comprising:
    determining a context of the robotic device;
    receiving an environmental input via at least one of the sensors, wherein the environmental input includes first environmental data received from a first source and second environmental data received from a second source, and wherein the first source and the second source are in the environment of the robotic device;
    determining that the first environmental data is relevant to the context of the robotic device and the second environmental data is not relevant to the context of the robotic device;
    in response to determining that the first environmental data is relevant to the context of the robotic device, performing, by the robotic device, an output function based on the first environmental data comprising:
      formulating a query based at least on the first environmental data that is relevant to the context;
      based on the query, searching for relational information corresponding to the first environmental data that is relevant to the context; and
      receiving the relational information corresponding to the first environmental data that is relevant to the context.

17. The robotic device of claim 16, wherein the one or more sensors comprise one or more acoustic sensors, wherein the one or more acoustic sensors are used to receive the environmental input, and wherein the first environmental data comprises audio data based on speech from the first source and the second environmental data comprises audio data based on speech from the second source.

18. The robotic device of claim 16, wherein the one or more sensors comprise one or more video capture devices, wherein the first environmental data comprises video data received from the first source.

19. The robotic device of claim 16, wherein performing the output function based on the environmental data comprises initiating a video feed to a remote computing device and displaying the relational information on a graphic display associated with the remote computing device.

20. The robotic device of claim 16, wherein the output function comprises an interaction by the robotic device with an object in the environment of the robotic device.

* * * * *